United States Patent
Campini et al.

(10) Patent No.: US 7,183,500 B2
(45) Date of Patent: Feb. 27, 2007

(54) ELECTROMAGNETIC INTERFERENCE (EMI) FILTER WITH PASSIVE NOISE CANCELLATION

(75) Inventors: Edoardo Campini, Mesa, AZ (US); Andy Saffarian, Folsom, CA (US); Jerome A. Saint Cyr, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/883,610

(22) Filed: Jun. 30, 2004

(65) Prior Publication Data

US 2006/0000353 A1 Jan. 5, 2006

(51) Int. Cl.
 *H05K 9/00* (2006.01)
(52) U.S. Cl. ............. 174/392; 174/355; 174/377; 174/390; 361/692; 454/184
(58) Field of Classification Search ........... 174/35 MS, 174/35 R, 350, 355, 357, 360, 377, 390, 174/392; 361/692, 816, 818; 454/184
See application file for complete search history.

(56) References Cited

U.S. PATENT DOCUMENTS

| | | | | |
|---|---|---|---|---|
| 3,821,463 A | * | 6/1974 | Bakker | 174/35 MS |
| 5,460,571 A | * | 10/1995 | Kato et al. | 454/184 |
| 5,928,076 A | * | 7/1999 | Clements et al. | 454/184 |
| 6,211,458 B1 | * | 4/2001 | Mitchell et al. | 174/35 R |
| 6,384,325 B1 | * | 5/2002 | Chastain et al. | 174/35 R |
| 6,459,579 B1 | * | 10/2002 | Farmer et al. | 361/695 |
| 6,552,900 B1 | * | 4/2003 | Hoefer et al. | 174/35 R |
| 6,639,794 B2 | * | 10/2003 | Olarig et al. | 454/184 |
| 6,680,847 B2 | * | 1/2004 | Heard | 361/692 |
| 6,776,706 B2 | * | 8/2004 | Kipka et al. | 454/184 |
| 6,870,092 B2 | * | 3/2005 | Lambert et al. | 174/35 GC |
| 6,989,487 B2 | * | 1/2006 | Hou | 174/483 |
| 7,038,124 B1 | * | 5/2006 | Sosnowski | 454/184 |
| 7,046,982 B2 | * | 5/2006 | Asano et al. | 455/349 |
| 2003/0085050 A1 | * | 5/2003 | Zarganis et al. | 174/35 MS |
| 2006/0017235 A1 | * | 1/2006 | Vesa | 277/650 |
| 2006/0037768 A1 | * | 2/2006 | Cochrane | 174/35 GC |

\* cited by examiner

*Primary Examiner*—Dean A. Reichard
*Assistant Examiner*—Adolfo Nino
(74) *Attorney, Agent, or Firm*—Blakely, Sokoloff, Taylor & Zafman LLP

(57) ABSTRACT

The application describes embodiments of an apparatus including a plurality of first channels, each having an inlet, an outlet, and a first path length between the inlet and the outlet, and a plurality of second channels, each having an inlet, an outlet, and a second path length between the inlet and the outlet. The second path length is different from the first path length, and each second channel is adjacent to at least one first channel. The application also describes embodiments of a process including suppressing electromagnetic radiation using a filter comprising a plurality channels, and simultaneously passively canceling noise at the outlets of the plurality of channels. Other embodiments are also described and claimed.

30 Claims, 6 Drawing Sheets

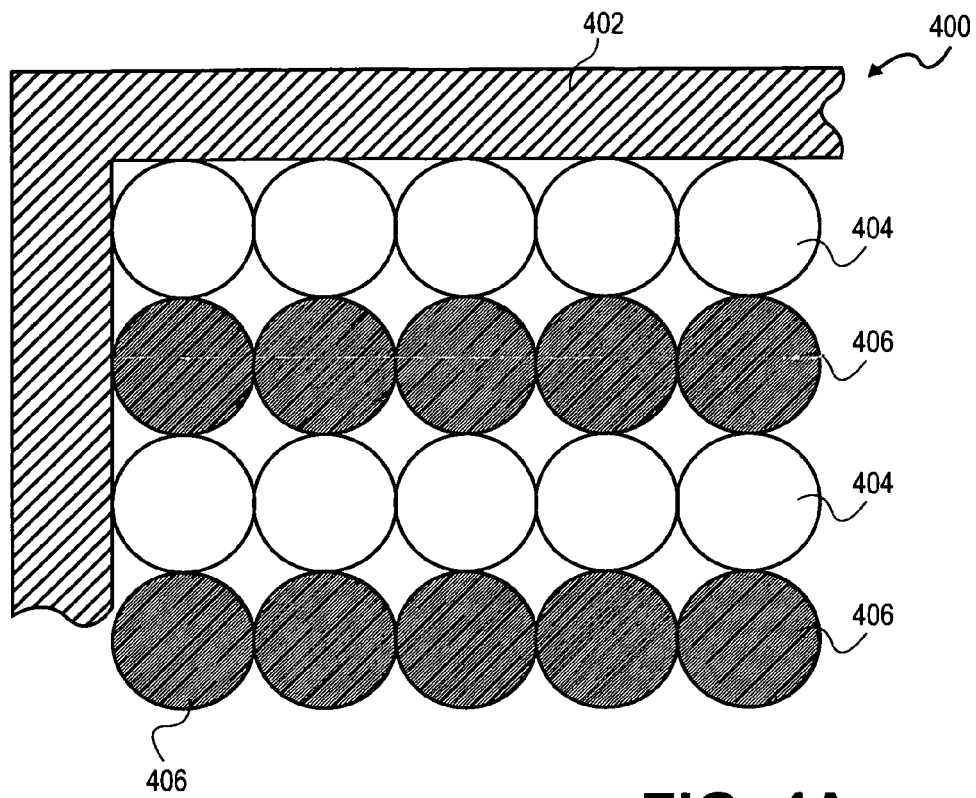
FIG. 4A
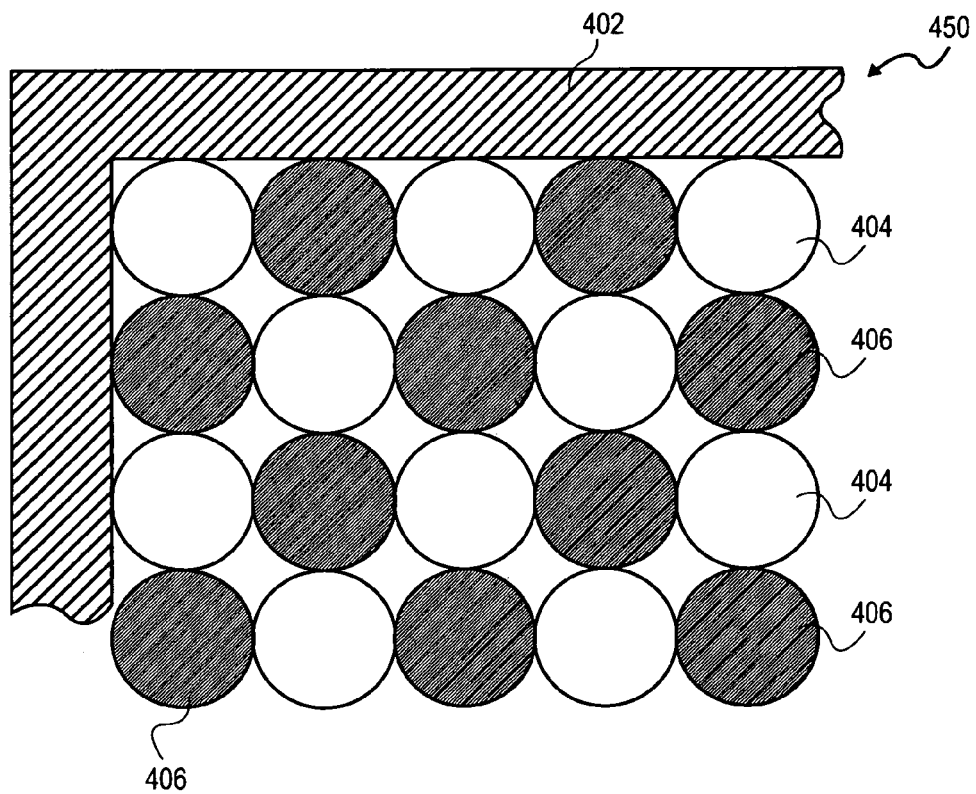

ELECTROMAGNETIC INTERFERENCE (EMI) FILTER WITH PASSIVE NOISE CANCELLATION

TECHNICAL FIELD

The present invention relates generally to electromagnetic interference (EMI) filters and in particular, but not exclusively, to EMI filters including passive noise cancellation.

BACKGROUND

Most electronic devices such as servers, computers and the like, are made up of various electronic components within some sort of metal box or chassis. In particular, many servers now fit on individual circuit boards known as "blades" and are placed within a chassis conforming to the PCI Industrial Computer Manufacturers Group (PICMG) Advanced Telecom Computing Architecture (ATCA) 3.0 standard, published January 2003. The ATCA standard defines an open switch fabric-based platform delivering an industry standard high performance, fault tolerant, and scalable solution for next generation telecommunications and data center equipment. The development of the ATCA standard is being defined by the PCI Industrial Computer Manufacturers Group (PICMG)—the same group that created the highly successful Compact PCI standard. The ATCA 3.0 base specification defines the physical and electrical characteristics of an off-the-shelf, modular chassis based on switch fabric connections between hot-swappable blades. Specifically, the ATCA 3.0 base specification defines the frame (rack) and shelf (chassis) form factors, core backplane fabric connectivity, power, cooling, management interfaces, and the electromechanical specification of the ATCA-compliant boards. The ATCA 3.0 base specification also defines a power budget of 200 Watts (W) per board, enabling high performance servers with multi-processor architectures and multi gigabytes of on-board memory.

During operation, each server's components emit electromagnetic radiation and also generate heat. To avoid electromagnetic interference or succesibility from other systems with nearby components or devices, it is desirable to prevent the electromagnetic radiation from leaving or entering the chassis. For optimum radiation protection, the chassis should be a completely closed metal box, which would block all the electromagnetic radiation from entering or leaving the box. For optimum heat removal, however, there would either be no chassis at all or the chassis would be a box with highly porous sides to allow substantial airflow and therefore substantial cooling of the components.

The requirements for electromagnetic radiation and heat transfer therefore conflict: the optimum radiation solution would prevent heat removal from the chassis, while the optimum heat solution would not provide adequate radiation suppression. In existing applications, a compromise solution has been to make the chassis a substantially solid box with electromagnetic interference (EMI) filters covering air outlets on one or more sides of the chassis. EMI filters allow air to flow through them while preventing passage of electromagnetic radiation.

As applications have become more demanding their power usage, and therefore the heat they generate, has increased substantially, meaning that more, bigger and/or faster fans are needed to draw cool air into the chassis and expel hot air from the chassis through the EMI filter. More or bigger fans, however, generate substantially more noise, both mechanical noise from the fan mechanisms themselves and noise from the airflow they create. In some cases, the noise is so substantial that it exceeds safety guidelines. Existing EMI filters have been adequate for limiting or reducing EMI emissions from the chassis while allowing adequate heat transfer, but these filters do nothing to reduce or eliminate noise emanating from the interior of the chassis. Attempts to reduce the noise output have focused on modifying the mechanisms and aerodynamics of the fans.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 4A is a front view of an embodiment of a filter including electromagnetic interference (EMI) suppression and passive noise cancellation.

FIG. 4B is a front view of an alternative embodiment of a filter including electromagnetic interference (EMI) suppression and passive noise cancellation.

DETAILED DESCRIPTION OF THE ILLUSTRATED EMBODIMENTS

Embodiments of an electromagnetic interference (EMI) filter with passive noise cancellation are described herein. In the following description, numerous specific details are described to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in this specification do not necessarily all refer to the same embodiment. Furthermore, the particular features, structures, or characteristics may be combined in any suitable manner in one or more embodiments.

Figure 1:
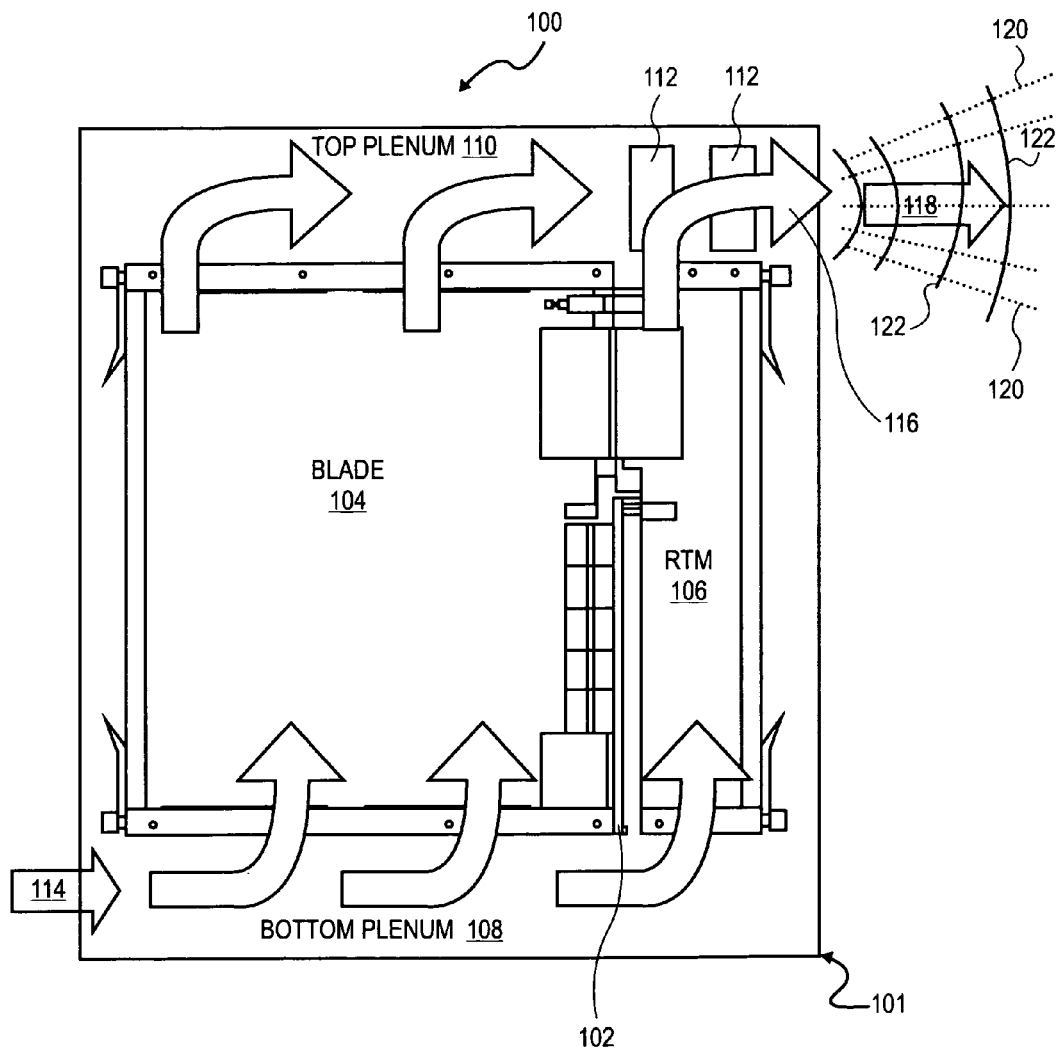
FIG. 1 is a side view of an embodiment of a server conforming the Advanced Telecom Architecture (ATCA) specification.

FIG. 1 illustrates a side view of a server 100 conforming to the Advanced Telecom Architecture (ATCA) specification. Although the server 100 is referred to in the singular, it can actually include many separate servers, each on its own blade. The server 100 includes a chassis 101 within which are found the electronic components that make up the server. The electronic components include one or more individual servers, each built on a separate blade 104. The blades 104, as well as an optional rear transition module (RTM) 106, are vertically oriented in the chassis and plug into a backplane 102. The backplane 102 functions as a sort of motherboard that connects the different blades together and manages communication between individual blades and exterior devices, as well as among blades on the backplane. The optional RTM 106 connects directly to the blade inserted in the front of the chassis without touching the backplane, and provides additional connections and functionality separate from the backplane.

The server 100 is cooled by air flowing through the chassis. Within the chassis 101, a bottom plenum 108 is located below the components, while a top plenum 110 is located above the electronic components. The bottom plenum includes an inlet through which cool air 114 can enter the chassis, while the top plenum 110 includes an outlet through which heated air 116 exits the chassis. Forced convection units, in this case a pair of fans 112, are located at or near the outlet. The fans both draw cool air 114 into the chassis and expel heated air 116 from the chassis, increasing the flow of air through the chassis and the overall amount of heat removed from the chassis.

When the server 100 is operating, the electronic components generate both heat and electromagnetic radiation. Cool air 114 enters the bottom plenum 108 through the inlet, turns upward so that it flows over the server blades 104. As it flows over the server blades, the air absorbs heat from the blades and increases in temperature to become heated air 116. The heated air 116 then turns toward the back of the chassis, where the fans 112 expel the heated air 116 through the outlet to the exterior of the chassis. Outside the chassis 101, a stream of warm air 118 flows away from the outlet, while both electromagnetic radiation 120 and sound waves 122 (i.e., noise) radiate from the outlet.

Figure 2:
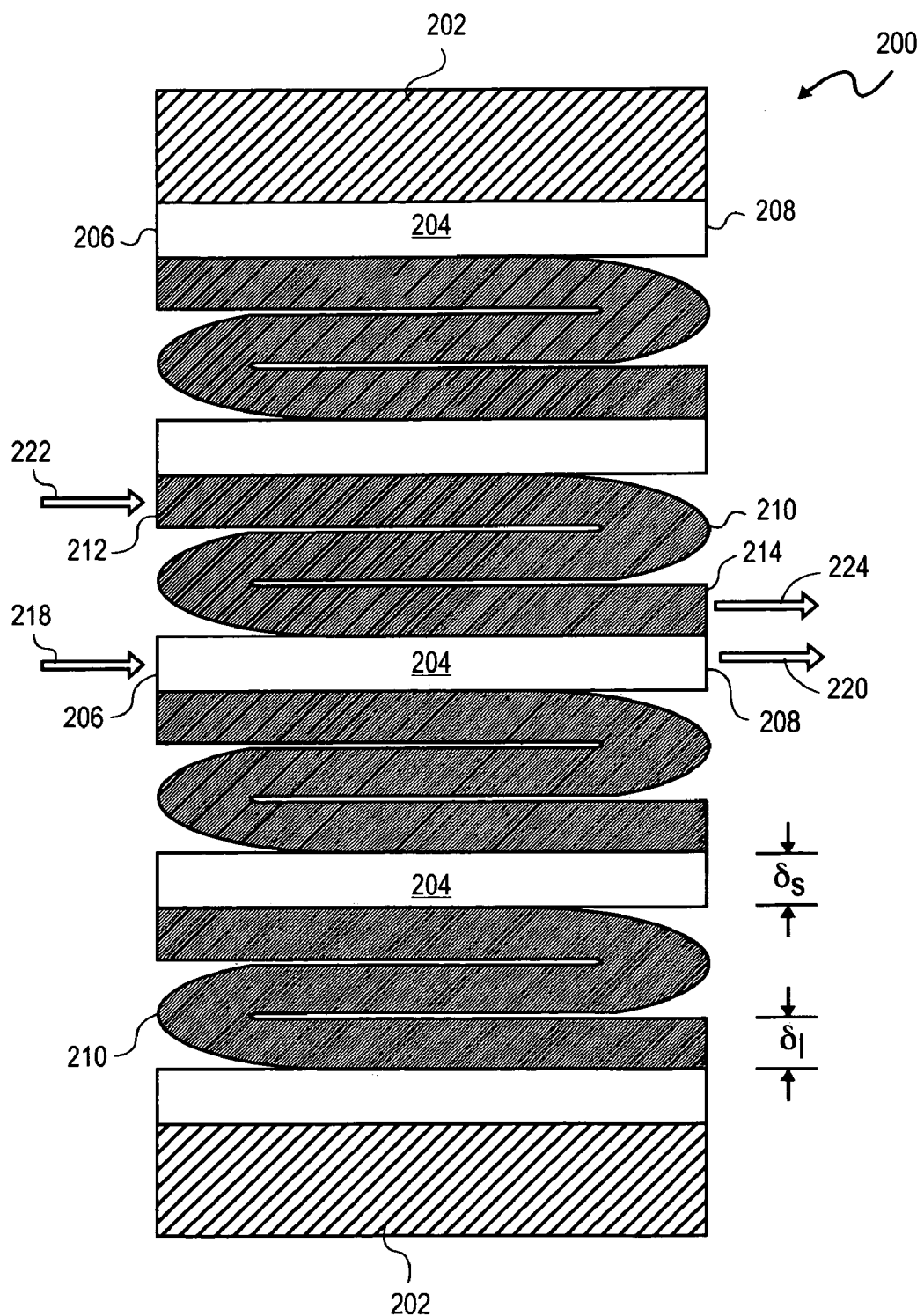
FIG. 2 is a side view of an embodiment of a filter including electromagnetic interference (EMI) suppression and passive noise cancellation.

FIG. 2 illustrates a side view of an embodiment of the invention comprising a filter 200. The filter 200 includes a frame 202 within which are arranged a plurality of first channels 204 and a plurality second channels 210. The plurality of first channels 204 and the plurality of second channels 210 are arranged within the frame so that the outlet 208 of each first channel is adjacent to the outlet 214 of at least one second channel 210.

Each first channel 204 is a substantially straight tube with an inlet 206 through which air can enter, and an outlet 208 through which air can exit. Each first channel also has a first acoustic path length (roughly the distance along the centerline of the channel between the inlet and outlet) and a maximum cross-sectional dimension $\delta_s$. Each second channel 210 is a substantially S-shaped tube with an inlet 212 through which air enters, and an outlet 214 through which air exits. Each second channel also has a second acoustic path length (roughly the distance along the centerline of the channel between the inlet and outlet) and a maximum cross-sectional dimension $\delta_l$. To prevent electromagnetic radiation from passing through the filter 200, the dimension $\delta_s$ of the first channels 204 and the dimension $\delta_l$ of the second channels 210 are selected to be less than or equal to the wavelength of the radiation to be suppressed. In one embodiment, the first channels 204 and second channels 210 are made of a conductor such as a metal, but in other embodiments the first and second channels can be made of a non-conducting material with a conductive coating. In still other embodiments requiring a reduction in acoustic emission without any EMI/RFI radiation/emission requirements, the channels can simply be made of a non-conducting material.

In operation of the filter 200, air enters the inlets 206 and 212 of the first and second channels and flows through to the outlets 208 and 214. Sound waves 218 enter the inlets 206 of the first channels, while sound waves 222 enter the inlets 212 of the second channels. At the inlets, the sound waves 218 and 222 are substantially in phase. The sound wave 218 travel straight through the first channels and exit the channels substantially unchanged as sound waves 220. The sound waves 222, however, must travel through the longer path of the substantially S-shaped second channels. Because the substantially S-shaped second channels have a longer path length than the straight first channels, the sound waves must cover a greater distance to travel through the second channels. The result is that the sound waves 224 exiting at the outlets of the second channels are out of phase with the sound waves exiting the outlet of the first channels. The difference in path length between the first and second channels is calculated so that the exiting sound waves are completely out of phase with each other and interfere destructively with each other, thus canceling each other and canceling the noise. Thus, the filter 200 suppresses electromagnetic radiation and passively cancels noise while allowing air to flow through it.

Figure 3:
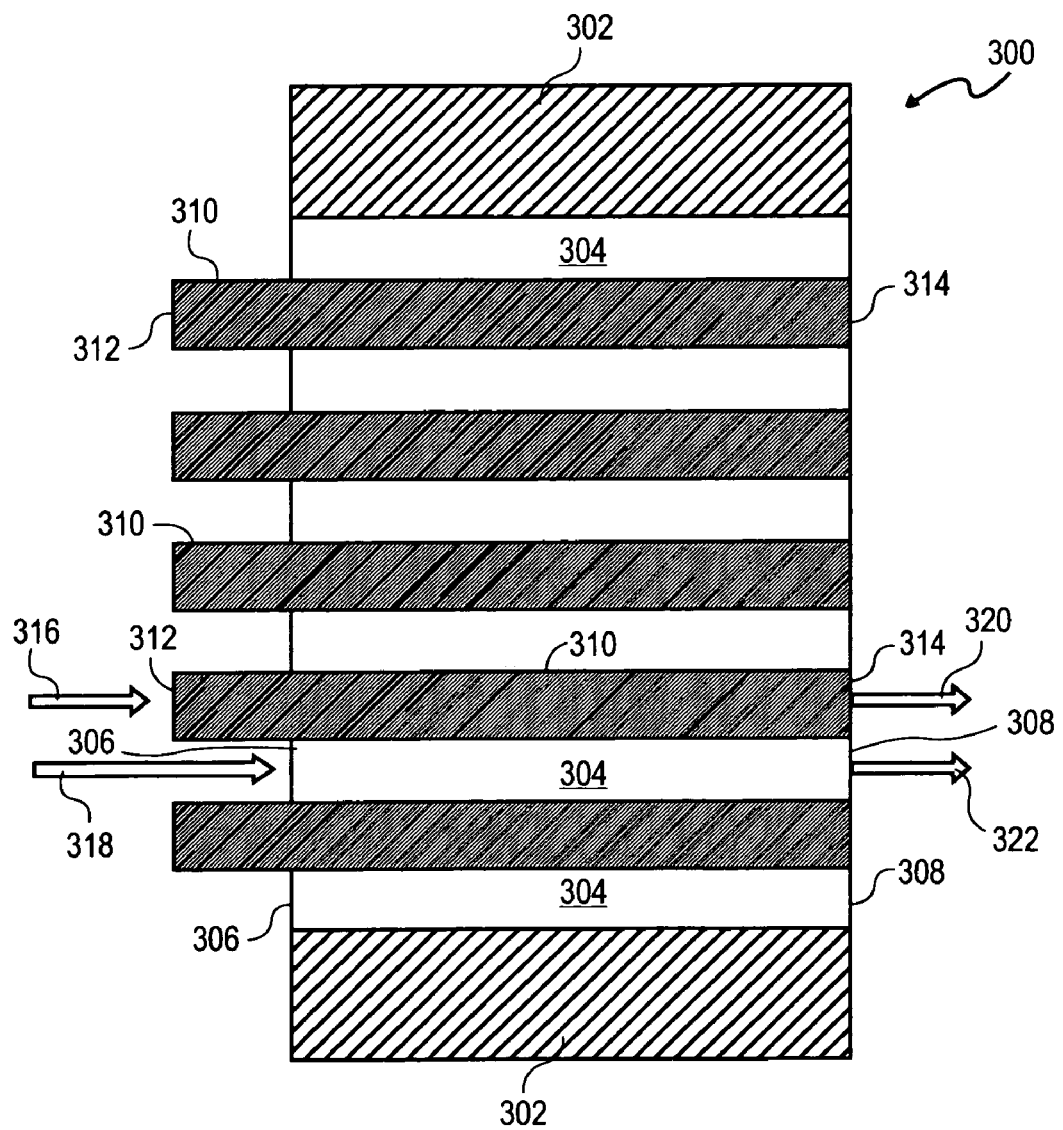
FIG. 3 is a side view of an alternative embodiment of a filter including electromagnetic interference (EMI) suppression and passive noise cancellation.

FIG. 3 illustrates a side view of an alternative embodiment of the invention comprising a filter 300. As with the filter 200, the filter 300 includes a frame 302 within which are arranged a plurality of first channels 304 and a plurality second channels 310. The plurality of first channels 304 and the plurality of second channels 310 are arranged within the frame so that the outlet 308 of each first channel is adjacent to the outlet 314 of at least one second channel 310.

The primary difference between the filter 200 and the filter 300 lies in the shape of the channels. As in the filter 200, each first channel 304 is a substantially straight tube with an inlet 306 through which air enters, an outlet 308 through which air exits, a maximum cross-sectional dimension $\delta_s$, and a first acoustic path length. In contrast to the filter 200, however, each second channel 310 is a substantially straight tube with an inlet 312 through which air enters, an outlet 314 through which air exits, a maximum cross-sectional dimension $\delta_l$, and a second acoustic path length. As in the filter 200, to prevent electromagnetic radiation from passing through the filter 300, the dimension $\delta_s$ of the first channels 304 and the dimension $\delta_l$ of the second channels 310 are selected to be less than or equal to the wavelength of the radiation to be suppressed. In one embodiment, the first channels 304 and second channels 310 are made of a conductor such as a metal, but in other embodiments the first and second channels can be made of a non-conducting material with a conductive coating. In still other embodiments requiring a reduction in acoustic emission without any EMI/RFI radiation/emission requirements, the channels can simply be made of a non-conducting material.

FIG. 4A illustrates an embodiment of an arrangement 400 of the first channels 404 and the second channels 406, using the filter 300 as an example. In the arrangement 400, both the first channels 404 and second channels 406 are arranged within a frame 402. The first and second channels alternate in one direction—that is, the channels are arranged in rows including only first channels 404 alternating with rows including only second channels 406. The result is that each first channel 404, except for those along the frame, is adjacent to two second channels 406—one in the row above and one in the row below. Similarly, each second channel 406 except for those along the frame is adjacent to two first channels 404—one in the row above and one in the row below. Although in the illustrated embodiment the first channels 404 and the second channels 404 are shown as circles with the same diameter, the first channels 404 and second channels 406 need not have the same cross-sectional shapes or maximum cross-sectional dimensions; as discussed below in connection with FIG. 5, many cross-sectional shapes and dimensions are possible. Additionally, the illustrated arrangement has the first channels 404 adjacent to the frame 402, but in other embodiments the second channels can be positioned adjacent to the frame.

FIG. 4B illustrates an alternative embodiment of an arrangement 450 of the first channels 404 and the second channels 406 in a filter, using the filter 300 as an example. In the arrangement 450, both the first channels 404 and second channels 406 are arranged within a frame 402. In contrast to the arrangement 400, in the arrangement 450 the first and second channels alternate in both directions—that is, the channels are arranged in alternating rows of alternating first channels 404 and second channels 406. Put another way, in the illustrated arrangement each row is made up of alternating first channels 404 and second channels 406, and is adjacent to a row also made up of alternating first channels 404 and second channels 406. Each row is offset from the adjacent row, so that each column is also made up of alternating first channels 404 and second channels 406. The result is that each first channel 404, except for those along the frame, is adjacent to four second channels 406 and, likewise, each second channel 406 is adjacent to four first channels 404. Although in the illustrated embodiment the first channels 404 and the second channels 404 have circular cross-sections with the same diameter, the first channels 404 and second channels 406 need not have the same cross-sectional shapes or maximum cross-sectional dimensions.

Figure 5A:
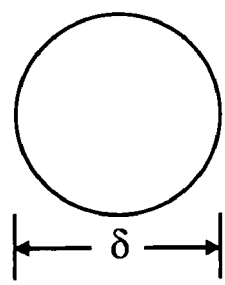
FIGS. 5A–5C are views illustrating various embodiments of cross-sectional shapes that can be used for the channels in embodiments of the filter.
Figure 5B:
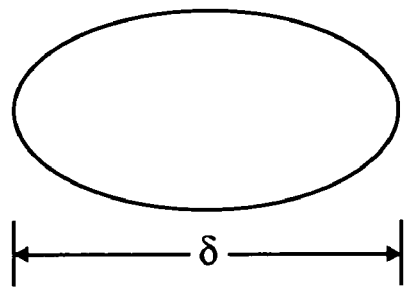
Figure 5C:
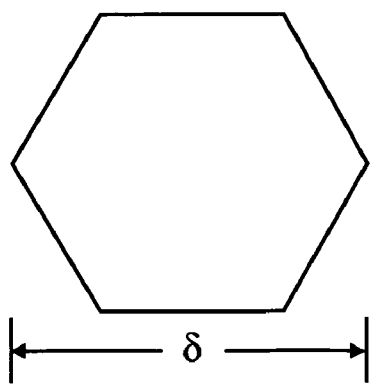

FIGS. 5A–5C illustrate embodiments of cross-sectional shapes that can be used for the first channels or second channels in the filters 200 and 300. FIG. 5A illustrates a circular cross section. As previously mentioned, for suppression of electromagnetic radiation the largest cross-sectional dimension of each channel must be less than or equal to the smallest wavelength to be suppressed. For the circular cross-section shown in FIG. 5A, the largest cross-sectional dimension δ is its diameter. FIG. 5B illustrates an elliptical cross-section, for which the largest cross-sectional dimension δ is its major axis. FIG. 5C illustrates a regular hexagon, for which the largest cross-sectional dimension δ is the distance between opposite vertices. In other embodiments, other cross-sectional shapes such as any regular or irregular polygon can be used as well.

Figure 6:
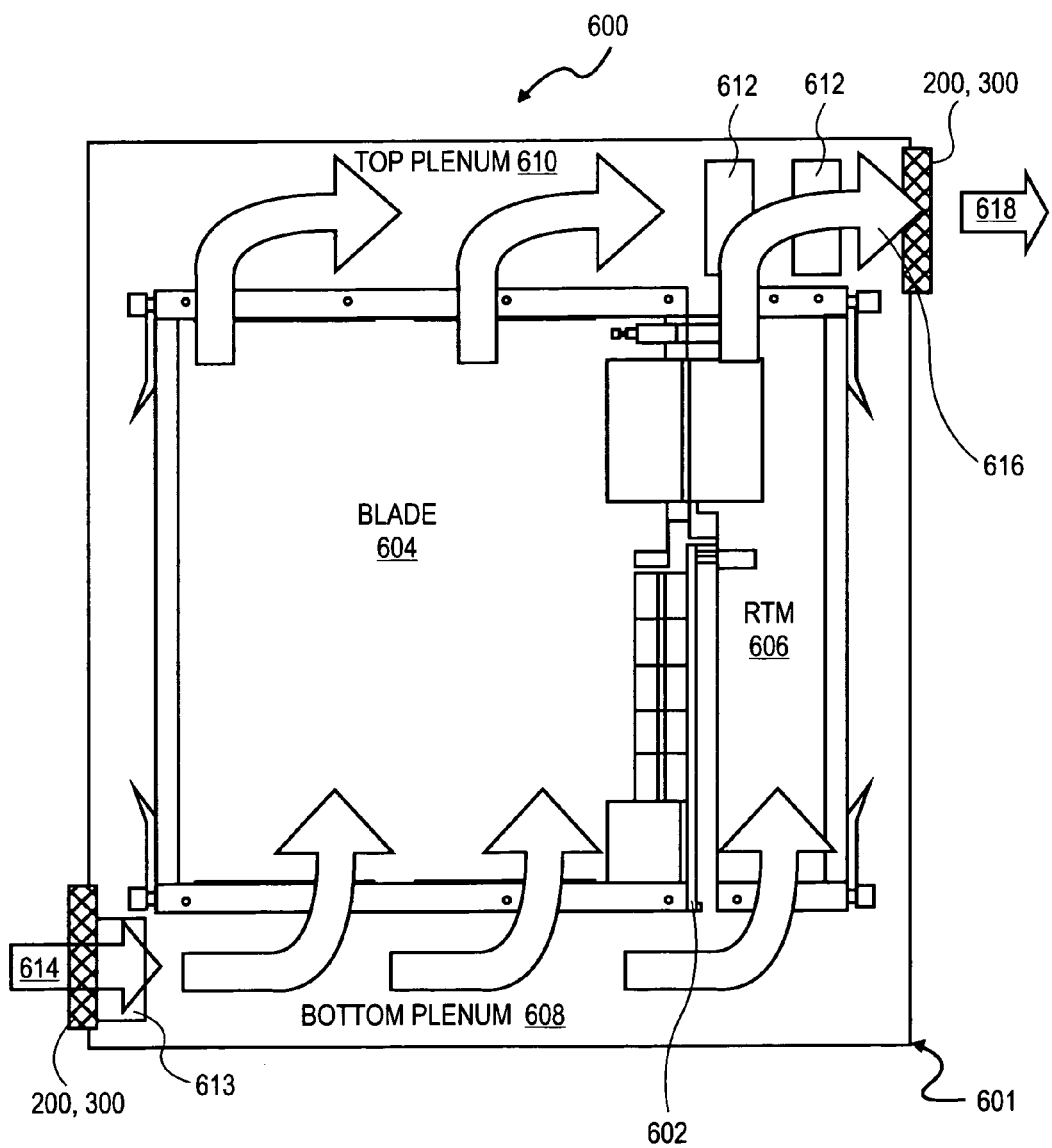
FIG. 6 is a side view of an embodiment of a system conforming the Advanced Telecom Architecture (ATCA) specification and incorporating an embodiment of a filter.

FIG. 6 illustrates a side view of an embodiment of a server 600 according to the present invention. The construction of the server 600 is substantially similar to that of the server 100. It includes a chassis 601 within which are found the electronic components that make up the server. The electronic components include one or more individual servers, each built on a blade 604. The blades 604, as well as an optional rear transition module (RTM) 606, are vertically oriented in the chassis. The backplane 602 functions as a sort of motherboard that connects all the server blades together and manages communication between individual blades and exterior device, as well as between different blades plugged into the backplane. The optional RTM 606 connects directly to the blade inserted in the front of the chassis without touching the backplane, and provides additional connections and functionality separate from the backplane. A filter such as filter 200 or 300 is placed over the outlet, and an optional filter such as filter 200 and 300 can be placed over the cool air inlet. Forced-convention units such as fans 612 are positioned near the outlet to push air through filter 200, 300 and a forced-convention unit 613 can optionally be placed near the inlet to draw air through the inlet filter 200, 300 if present.

In operation of the server 600, the electronic components generate both heat and electromagnetic radiation. Cool air 614 enters the chassis 601 through the filter 200, 300 if present, and then turns upward so that it flows over the server blades 604 and absorbs heat to become heated air 616. The heated air 616 then turns again toward the back of the server, where the fans 612 force the heated air 616 through the filter 200, 300 to the exterior of the chassis. Outside the chassis 601 a stream of warm air 618 flows away from the chassis, but both electromagnetic radiation and sound waves (i.e., noise) are suppressed by the filter 200, 300 and, if present, by the filter 200, 300.

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A filter array comprising:
 a plurality of adjacent rows, each row including first channels, second channels, or both first channels and second channels; and
 a plurality of adjacent columns, each column including both first and second channels, wherein each second channel in the array is adjacent to at least one first channel, and wherein each first channel has a first path length and each second channel has a second path length, the first path length being different from the second path length.

2. The filter array of claim 1 wherein the plurality of adjacent rows is transposed with the plurality of adjacent columns.

3. The filter array of claim 1 wherein the first path length is greater than the second path length.

4. The filter array of claim 1 wherein the first path length is smaller than the second path length.

5. The filter array of claim 1 wherein each first channel comprises a straight tube and each second channel comprises a curved tube.

6. The filter array of claim 1 wherein each first channel comprises a straight tube and each second channel comprises a straight tube.

7. The filter array of claim 1 wherein the first and second channels are arranged in rows of first channels alternating with rows of second channels.

8. The filter array of claim 1 wherein the first and second channels are arranged in offset rows of alternating first channels and second channels.

9. The filter array of claim 1 wherein a maximum cross-sectional dimension of the first and second channels is equal to or smaller than a selected wavelength of electromagnetic radiation.

10. The filter array of claim 1 wherein the cross-sectional shape of the first and second channels is selected from a group consisting of circular, elliptical, and polygonal shapes.

11. The filter array of claim 1 wherein the first and second channels are made of a metal or a material with a metallic coating.

12. The filter array of claim 1 wherein the first and second channels are made of a non-metallic material.

13. A system comprising:
a chassis including an air inlet and an air outlet, and having therein a plurality of components that generate heat and emit electromagnetic radiation;
a forced-convection device proximate to the air outlet;
a filter array covering the air outlet, the filter array comprising:
a plurality of adjacent rows, each row including first channels, second channels, or both first channels and second channels; and
a plurality of adjacent columns, each column including both first and second channels, wherein each second channel in the array is adjacent to at least one first channel, and wherein each first channel has a first path length and each second channel has a second path length, the first path length being different from the second path length.

14. The system of claim 13 wherein the forced-convection device is a fan.

15. The system of claim 13 wherein the first path length is greater than the second path length.

16. The system of claim 13 wherein the first path length is smaller than the second path length.

17. The system of claim 13 wherein the first and second channels are arranged in rows of first channels alternating with rows of second channels.

18. The system of claim 13 wherein the first and second channels are arranged in offset rows of alternating first channels and second channels.

19. The system of claim 13 wherein a maximum cross-sectional dimension of the first and second channels is equal to or smaller than a selected wavelength of electromagnetic radiation.

20. The system of claim 13, further comprising:
a filter array covering the air inlet, the filter array comprising:
a plurality of adjacent rows, each row including first channels, second channels, or both first channels and second channels; and
a plurality of adjacent columns, each column including both first and second channels, wherein each second channel in the array is adjacent to at least one first channel, and wherein each first channel has a first path length and each second channel has a second path length, the first path length being different from the second path length.

21. The system of claim 20, further comprising a forced-convection device positioned proximate to the air inlet.

22. A process comprising:
directing electromagnetic radiation and sound at a filter array, the filter array including:
a plurality of adjacent rows, each row including first channels, second channels, or both first channels and second channels; and
a plurality of adjacent columns, each column including both first and second channels, wherein each second channel in the array is adjacent to at least one first channel, and wherein each first channel has a first path length and each second channel has a second path length, the first path length being different from the second path length;
suppressing the electromagnetic radiation in the first and second channels; and
passively canceling noise at outlets of the channels in the filter array.

23. The process of claim 22 wherein directing electromagnetic radiation and sound at the filter array comprises:
placing a sound source proximate to the filter array; and
placing a source of electromagnetic radiation proximate to the filter array.

24. The process of claim 22 wherein the filter array is positioned over a ventilation outlet of a chassis, and wherein directing electromagnetic radiation and sound at the filter array comprises:
operating a forced-convection device inside the chassis; and
operating an electronic device inside the chassis.

25. The process of claim 24, further comprising directing cooling air through the filter array.

26. The process of claim 22 wherein suppressing the electromagnetic radiation comprises selecting a maximum cross-sectional dimension of the first and second channels equal to or smaller than a selected wavelength of electromagnetic radiation.

27. The process of claim 22 wherein passively canceling noise comprises using the difference between the first path length and the second path length to create a destructive phase difference between sound exiting the first channels and sound exiting the second channels.

28. A process comprising:
suppressing electromagnetic radiation using a filter array, the filter array including:
a plurality of adjacent rows, each row including first channels, second channels, or both first channels and second channels; and
a plurality of adjacent columns, each column including both first and second channels, wherein each second channel in the array is adjacent to at least one first channel, and wherein each first channel has a first path length and each second channel has a second path length, the first path length being different from the second path length; and
simultaneously passively canceling noise at outlets of the channels in the filter array.

29. The process of claim 28 wherein suppressing the electromagnetic radiation comprises selecting a maximum cross-sectional dimension of the first and second channels equal to or smaller than a selected wavelength of the electromagnetic radiation.

30. The process of claim 28 wherein passively canceling noise comprises using the difference between the first path length and the second path length to create a destructive phase difference between sound exiting the first channels and sound exiting the second channels.

* * * * *